United States Patent
Crosby et al.

(10) Patent No.: US 10,044,232 B2
(45) Date of Patent: Aug. 7, 2018

(54) INDUCTIVE POWER TRANSFER USING ACOUSTIC OR HAPTIC DEVICES

(71) Applicant: Apple Inc., Cupertino, CA (US)

(72) Inventors: Justin D. Crosby, Cupertino, CA (US);
Nikolas T. Vitt, Cupertino, CA (US);
Gary P. Geaves, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 14/245,817

(22) Filed: Apr. 4, 2014

(65) Prior Publication Data

US 2015/0288193 A1 Oct. 8, 2015

(51) Int. Cl.
| | | |
|---|---|---|
| *H02J 50/15* | (2016.01) | |
| *H02J 5/00* | (2016.01) | |
| *H02J 50/90* | (2016.01) | |
| *H04R 9/04* | (2006.01) | |

(52) U.S. Cl.
CPC .............. *H02J 50/15* (2016.02); *H02J 5/005* (2013.01); *H02J 50/90* (2016.02); *H04R 9/04* (2013.01)

(58) Field of Classification Search
CPC .................................. H04R 1/02; H02J 5/005
USPC .................................................. 381/400, 386
See application file for complete search history.

(56) References Cited

U.S. PATENT DOCUMENTS

| | | |
|---|---|---|
| 3,502,809 A | 3/1970 | Dickey |
| 4,785,136 A | 11/1988 | Mollet |
| 4,871,220 A | 10/1989 | Kohin |
| 5,373,102 A | 12/1994 | Ehrlich et al. |
| 5,384,575 A | 1/1995 | Wu |
| 5,496,966 A | 3/1996 | Hightower et al. |
| 5,545,844 A | 8/1996 | Plummer, III |
| 5,563,614 A | 10/1996 | Alden |
| 5,760,584 A | 6/1998 | Frederick |
| 6,144,512 A | 11/2000 | Eden |
| 6,269,247 B1 | 7/2001 | Chiodini |
| 6,449,181 B1 | 9/2002 | Rieger et al. |
| 6,492,587 B1 | 12/2002 | Yoshinaga |

(Continued)

FOREIGN PATENT DOCUMENTS

| | | |
|---|---|---|
| EP | 2211438 | 7/2010 |
| EP | 2256895 | 12/2010 |

(Continued)

OTHER PUBLICATIONS

U.S. Appl. No. 15/422,345, filed Feb. 1, 2017, Qiu et al.

(Continued)

*Primary Examiner* — Matthew Eason
*Assistant Examiner* — Phan Le
(74) *Attorney, Agent, or Firm* — Brownstein Hyatt Farber Schreck, LLP

(57) ABSTRACT

A first electronic device includes a first coil that is operative in at least two modes. In a first mode, the first coil may be utilized to moves a membrane to produce one or more sound waves, register movement of a membrane to detect one or more sound waves, or generates one or more haptic outputs. In the second mode, the first coil may be used to inductively transmit power to and/or inductively receive power from a second coil included in a second electronic device. In various cases, the second coil may be a dedicated inductive power transmission coil. In other cases, the second coil may be capable of multimode operation similar to the first coil.

20 Claims, 7 Drawing Sheets

(56) References Cited

U.S. PATENT DOCUMENTS

| | | |
|---|---|---|
| 6,724,950 B2 | 4/2004 | Byrne |
| 6,768,051 B2 | 7/2004 | Wiltshire |
| 6,864,419 B2 | 3/2005 | Lovens |
| 6,927,574 B2 | 8/2005 | Young |
| 7,035,087 B2 | 4/2006 | Tan |
| 7,170,363 B2 | 1/2007 | Wiltshire |
| 7,466,077 B2 | 12/2008 | Joo et al. |
| 7,639,206 B2 | 12/2009 | Behdad |
| 7,679,205 B1 | 3/2010 | Burns |
| 7,705,591 B2 | 4/2010 | Geren et al. |
| 7,732,038 B2 | 6/2010 | Naito et al. |
| 7,737,370 B2 | 6/2010 | Aoyama et al. |
| 7,906,936 B2 | 3/2011 | Azancot et al. |
| 7,948,208 B2 | 5/2011 | Partovi et al. |
| 7,948,781 B2 | 5/2011 | Esaka et al. |
| 7,952,322 B2 | 5/2011 | Partovi et al. |
| 8,050,063 B2 | 11/2011 | Wagoner et al. |
| 8,101,931 B2 | 1/2012 | Blandford, III |
| 8,115,448 B2 | 2/2012 | John |
| 8,169,185 B2 | 5/2012 | Partovi et al. |
| 8,193,769 B2 | 6/2012 | Azancot et al. |
| 8,262,244 B2 | 9/2012 | Metcalf |
| 8,338,990 B2 | 12/2012 | Baarman et al. |
| 8,421,274 B2 | 4/2013 | Sun et al. |
| 8,436,317 B1 | 5/2013 | Chen |
| 8,531,153 B2 | 9/2013 | Baarman et al. |
| 8,629,652 B2 | 1/2014 | Partovi et al. |
| 8,629,654 B2 | 1/2014 | Partovi et al. |
| 8,723,053 B2 | 5/2014 | Winch |
| 8,729,734 B2 | 5/2014 | Widmer et al. |
| 8,760,113 B2 | 6/2014 | Keating et al. |
| 8,810,196 B2 | 8/2014 | Ettes et al. |
| 8,838,022 B2 | 9/2014 | Dobyns |
| 8,890,470 B2 | 11/2014 | Partovi |
| 8,896,264 B2 | 11/2014 | Partovi |
| 8,901,881 B2 | 12/2014 | Partovi |
| 8,928,284 B2 | 1/2015 | Carobolante |
| 8,947,047 B2 | 2/2015 | Partovi et al. |
| 8,947,892 B1 | 2/2015 | Lam |
| 9,025,143 B2 | 5/2015 | Hahn |
| 9,071,062 B2 | 6/2015 | Whitehead |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,124,126 B2 | 9/2015 | Ichikawa |
| 9,153,998 B2 | 10/2015 | Mayo |
| 9,171,555 B2 | 10/2015 | Meloche |
| 9,178,369 B2 | 11/2015 | Partovi |
| 9,209,627 B2 | 12/2015 | Baarman et al. |
| 9,217,323 B2 | 12/2015 | Clark |
| 9,276,437 B2 | 3/2016 | Partovi et al. |
| 9,356,659 B2 | 5/2016 | Partovi |
| 9,497,894 B1 | 11/2016 | Ramsey |
| 9,577,460 B2 | 2/2017 | Park |
| 9,711,272 B2 | 7/2017 | Hassan-Ali et al. |
| 9,726,518 B2 | 8/2017 | Widmer et al. |
| 9,917,479 B2 | 3/2018 | Bronson et al. |
| 2002/0137473 A1 | 9/2002 | Jenkins |
| 2004/0021376 A1 | 2/2004 | Beulich |
| 2007/0103110 A1* | 5/2007 | Sagoo ............... H02J 7/025 320/109 |
| 2008/0067914 A1 | 3/2008 | Kim et al. |
| 2009/0052721 A1* | 2/2009 | Dabrowski ......... A61C 17/22 381/386 |
| 2010/0015918 A1 | 1/2010 | Liu et al. |
| 2010/0194336 A1* | 8/2010 | Azancot ............... G06F 1/26 320/108 |
| 2011/0050164 A1 | 3/2011 | Partovi et al. |
| 2011/0169770 A1 | 7/2011 | Mishina et al. |
| 2011/0221385 A1 | 9/2011 | Partovi et al. |
| 2012/0104997 A1 | 5/2012 | Carobolante |
| 2012/0139358 A1 | 6/2012 | Teggatz et al. |
| 2012/0198364 A1 | 8/2012 | Bornheimer et al. |
| 2012/0229073 A1* | 9/2012 | Prescott ............... H02N 2/18 320/107 |
| 2013/0002038 A1* | 1/2013 | Lee ..................... H02J 7/00 307/104 |
| 2013/0043734 A1 | 2/2013 | Stone et al. |
| 2013/0093388 A1 | 4/2013 | Partovi |
| 2013/0099563 A1 | 4/2013 | Partovi et al. |
| 2013/0127404 A1* | 5/2013 | Maenpaa ............ H02J 7/025 320/108 |
| 2013/0193775 A1* | 8/2013 | Lee ..................... H02J 5/00 307/151 |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0035383 A1 | 2/2014 | Riehl |
| 2014/0103873 A1 | 4/2014 | Partovi et al. |
| 2014/0132210 A1 | 5/2014 | Partovi |
| 2014/0191568 A1 | 7/2014 | Partovi |
| 2014/0306654 A1 | 10/2014 | Partovi |
| 2014/0354279 A1 | 12/2014 | Dumoulin |
| 2015/0043424 A1 | 2/2015 | Mitchell |
| 2015/0130412 A1 | 5/2015 | Partovi |
| 2015/0318710 A1 | 11/2015 | Lee et al. |
| 2015/0333530 A1 | 11/2015 | Moyer et al. |
| 2015/0333562 A1 | 11/2015 | Nam et al. |
| 2016/0036261 A1 | 2/2016 | Lenive |
| 2016/0064137 A1 | 3/2016 | Perez et al. |
| 2016/0172894 A1 | 6/2016 | Khripkov et al. |
| 2016/0181853 A1 | 6/2016 | Yang et al. |
| 2016/0196943 A1 | 7/2016 | Jarrahi et al. |
| 2016/0284465 A1 | 9/2016 | Maniktala |
| 2016/0372948 A1 | 12/2016 | Kvols |
| 2017/0092409 A1 | 3/2017 | Graham |
| 2017/0093199 A1 | 3/2017 | Pinciuc et al. |

FOREIGN PATENT DOCUMENTS

| | | |
|---|---|---|
| JP | 5510608 | 6/2014 |
| WO | WO 08/032746 | 3/2008 |

OTHER PUBLICATIONS

U.S. Appl. No. 15/474,569, filed Mar. 30, 2017, Jain et al.
U.S. Appl. No. 15/272,379, filed Sep. 21, 2016, Graham.
U.S. Appl. No. 15/274,610, filed Sep. 23, 2016, Pinciuc et al.

* cited by examiner

US 10,044,232 B2

INDUCTIVE POWER TRANSFER USING ACOUSTIC OR HAPTIC DEVICES

TECHNICAL FIELD

This disclosure relates generally to inductive power transfer, and more specifically to using acoustic or haptic devices in inductive power transfer.

BACKGROUND

Induction may be utilized to wirelessly transmit power between electronic devices. Such wireless power transmission may be performed for the purposes of powering one or more devices, charging one or more batteries, an/or other such purposes.

Inductive power transmission may be optimally efficient when power is inductively transmitted between dedicated transmitting and receiving induction coils that are both wrapped around a common iron core. However, this approach may require the ability to have a common iron core. Such may not be feasible in many designs and/or may result in other issues such as an inability to adequately seal electronic devices between which power is being transferred.

Another approach may be to inductively transmit power between two dedicated transmitting and receiving induction coils that each have an air core. This may remove the requirement for a common iron core and may prevent other issues relating to use of a common iron core. However, this approach may still require transmitting and receiving induction coils. Such may cause issues in situations where the number of components in electronic devices and/or the spacing of such components are a problem.

SUMMARY

The present disclosure discloses systems, apparatuses, and methods for inductive power transmission. A first electronic device may include at least a first coil that may be a component of an acoustic device (such as a microphone or speaker), a haptic device, and/or other device. The first coil may be operative in at least two modes. In the first mode, the first coil may be utilized to perform a function other than inductive power transfer such as moving a membrane to produce sound waves, registering movement of a membrane to detect sound waves, or generating one or more haptic outputs. In the second mode, the first coil may be used to inductively transmit power to and/or inductively receive power from at least one second coil included in a second electronic device.

In various implementations, the second coil may be a dedicated inductive transmitter and/or receiver coil. However, in other implementations the second coil may also operate in at least a first and second mode similar to the first coil.

In some implementations, current may be applied at different frequencies to the first coil in the first and second modes. For example, current may be applied at a first frequency in the first mode that causes the first coil to move at least one membrane to produce sound waves, register movement of the membrane to detect one or more sound waves, or generate one or more haptic outputs. In the second mode, current may be applied at a second frequency such that the membrane does not move, the membrane moves such that the produced sound waves are audibly imperceptible to humans, haptic output is not produced, or the haptic output generated is imperceptible to humans.

In various implementations, one or more surfaces of the first electronic device may be configured (such as geometrically) to mate with one or more surfaces of the second electronic device. Such mating may position the first coil to be in proximity to the second coil.

In one or more embodiments, a system for inductive power transfer includes a first electronic device having a membrane, a first coil associated with the first electronic device, and a controller operable to change the first coil between a first mode and a second mode. The first coil may be operable in the first mode to move the membrane to produce one of sound or a haptic output or detect the sound using the membrane. The first coil may be operable in the second mode to inductively transmit power to a second electronic device or inductively receive power from the second electronic device.

In some embodiments, an electronic device includes a first coil and a controller operable to change the first coil between a first mode and a second mode. The first coil may be operable in the first mode to move the membrane to produce one of sound or a haptic output or detect the sound using the membrane. The first coil may be operable in the second mode to inductively transmit power to a second electronic device or inductively receive power from the second electronic device.

In various embodiments, a method for inductively transferring power includes: operating a first coil associated with a first electronic device in a first mode wherein the first coil is operable in the first mode to move a membrane to produce one of sound or a haptic output or detect the sound using the membrane; and operating the first coil in at least one second mode wherein the first coil is operable in the second mode to inductively transmit power to a second electronic device or inductively receive power from the second electronic device.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
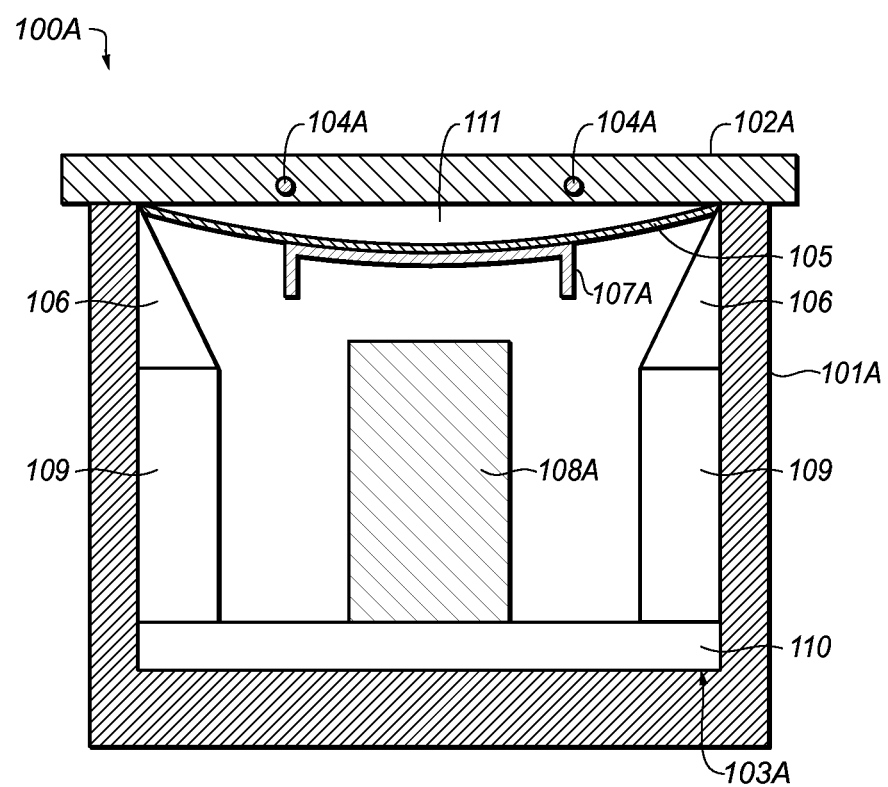
FIG. 1A is a cross-sectional diagram illustrating a first example system for inductive power transmission.

The description that follows includes sample systems, methods, and computer program products that embody various elements of the present disclosure. However, it should be understood that the described disclosure may be practiced in a variety of forms in addition to those described herein.

The present disclosure discloses systems, apparatuses, and methods for inductive power transmission. A first electronic device may include at least a first coil. The first coil may be operative in at least two modes. In the first mode, the first coil may be utilized to perform a function other than inductive power transfer. In the second mode, the first coil may be used to inductively transmit power to and/or inductively receive power from at least one second coil included in a second electronic device.

In some implementations, the first coil may be a component of an acoustic device such as a microphone or speaker. In the first mode in such implementations, the first coil may be a voice coil and/or similar component of the acoustic device that moves at least one membrane to produce sound waves and/or registers movement of the membrane to detect one or more sound waves. In other implementations, the first coil may be a component of a haptic device. In the first mode in such implementations, the first coil may generate one or more haptic outputs, such as one or more vibrations or 'taps.'

In various implementations, the second coil may be a dedicated inductive transmitter and/or receiver coil. However, in other implementations the second coil may also operate in at least a first and second mode. In the first mode, the second coil may be utilized to perform a function other than inductive power transfer (such as moving and/or registering the movement of a membrane of an acoustic module, producing a haptic output, and so on). In the second mode, the second coil may be used to inductively transmit power to and/or inductively receive power from the first coil. As such, the second coil may similarly be a voice coil or similar component of an acoustic module such as a microphone and/or speaker, a component of a haptic device, and so on.

Although the first and second modes are described herein and in the accompanying figures as separate modes, it is understood that this is an example. In some cases, the first coil may be simultaneously operable in both the first and second modes.

In some implementations, current may be applied to the first coil in the first and second modes. In such implementations, the current may be applied at different frequencies in the first and second modes. For example, current may be applied at a first frequency in the first mode that causes the first coil to move at least one membrane to produce sound waves, register movement of the membrane to detect one or more sound waves, or generate one or more haptic outputs. In the second mode, current may be applied at a second frequency such that the membrane does not move, the membrane moves such that the produced sound waves are audibly imperceptible to humans, haptic output is not produced, or the haptic output generated is imperceptible to humans.

In various implementations, one or more surfaces of the first electronic device may be configured (such as geometrically) to mate with one or more surfaces of the second electronic device. Such mating may position the first coil to be in proximity to the second coil.

In one or more implementations, the first coil may be a component of a speaker such as a voice coil that is positioned around a center magnetic element. In some cases, the center magnetic element may be a permanent magnet. In other cases, the center magnetic element may be an electromagnet such as a fields coil.

In cases where the center magnetic element is an electromagnet, the electromagnet may be activated in the first mode such that a polarity of the electromagnet opposes and/or matches a polarity of the first coil in order to cause movement of a membrane. In the second mode, the electromagnet may be deactivated and/or may be activated such that the electromagnet assists the first coil in inductively transmitting power to and/or inductively receiving power from the second coil.

FIG. 1A is a cross-sectional diagram illustrating a first example system 100A for inductive power transmission. As illustrated, the system may include a first electronic device 101A and a second electronic device 102A.

The first electronic device 101A and/or the second electronic device 102A may be any kind of electronic device such as a desktop computer, a laptop computer, a digital media player, a wearable device, a tablet computer, a mobile computer, a smart phone, a cellular telephone, a dock, and/or any other kind of electronic device. In some cases, the first electronic device may be a dock for the second electronic device or vice versa.

As illustrated, the first electronic device 101A may include an acoustic device 103A, which may be a speaker, a microphone, and/or other such acoustic device. As also illustrated, the second electronic device 102A may include a dedicated inductive power transmission system coil 104A.

The acoustic device 103A may include a first coil 107A that may be a voice coil. The first coil may be coupled to a membrane 105 that is in turn coupled to housing elements 106. The first coil may be positioned around a center magnetic element 108A, which may be a permanent magnet, that is positioned between side magnetic elements 109. The center magnetic element and side magnetic elements may be positioned on top of a magnetic yoke element 110. In cases where the acoustic device is a speaker, current may be applied to the first coil to generate magnetic flux that is directed by the center magnetic element, the side magnetic elements to cause the membrane to move. Such movement may produce one or more sound waves.

Figure 1B:
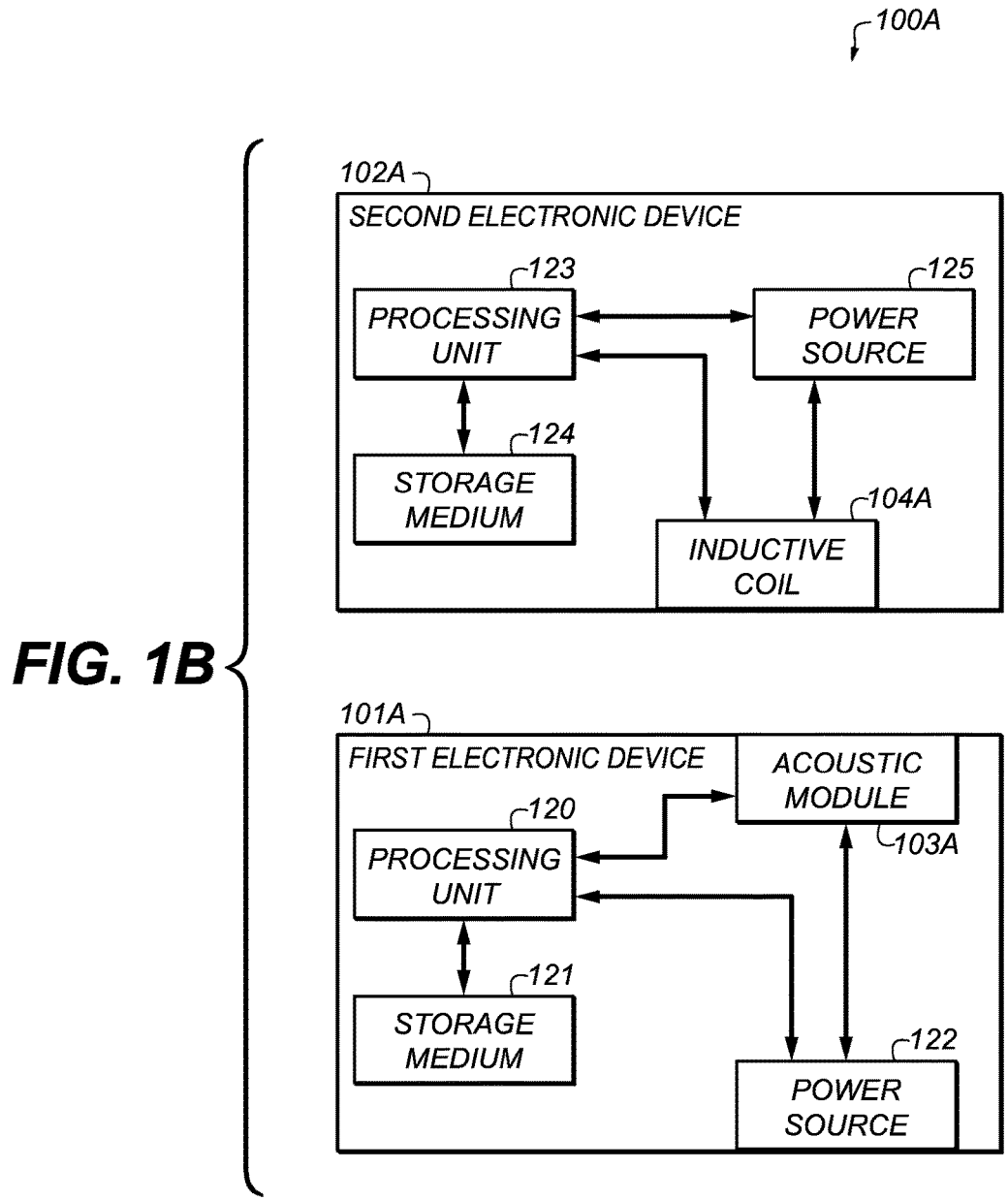
FIG. 1B is a block diagram illustrating the functional relationship of possible components of the first example system of FIG. 1A.

FIG. 1B is a block diagram illustrating the functional relationship of possible components of the first example system 100A of FIG. 1A. Although particular components are illustrated, it is understood that this is an example. In various implementations, one or more illustrated components may not be utilized and/or one or more additional components not shown may be utilized.

As illustrated, the first electronic device 101A may include one or more processing units 120 and/or other controllers, one or more non-transitory storage media 121 (which may take the form of, but is not limited to, a magnetic storage medium; optical storage medium; magneto-optical storage medium; read only memory; random access memory; erasable programmable memory; flash memory; and so on), one or more power sources (such as one or more batteries, one or more alternating current power sources such as a wall outlet, and so on), and/or the acoustic module 103A (including the first coil 107A).

As similarly illustrated, the second electronic device 102A may include one or more processing units 123 and/or other controllers, one or more non-transitory storage media 124 (which may take the form of, but is not limited to, a magnetic storage medium; optical storage medium; magneto-optical storage medium; read only memory; random access memory; erasable programmable memory; flash memory; and so on), one or more power sources (such as one or more batteries, one or more alternating current power sources such as a wall outlet, and so on), and/or the second (inductive) coil 104A.

With reference to FIGS. 1A and 1B, the first coil 107A may be operable in a plurality of modes. In a first mode, the first coil may be utilized to move the membrane 105 to produce one or more sound waves and/or register movement of the membrane to detect one or more sound waves. In a second mode, the first coil may be utilized to inductively transmit power to the second coil 104A (which may be stored by the power source 125 and/or utilized to operate the second electronic device 102A) and/or inductively receive power from the second coil (which may be stored by the power source 122 and/or utilized to operate the first electronic device 101A).

In some implementations of this example, the first coil 107A may only transmit power to the second coil 104A in the second mode. In other implementations, the first coil may only receive power transmitted by the second coil. In still other implementations, the first coil may be operable to either transmit power to the second coil or receive power transmitted by the second coil.

Although the first and second modes are described as separate modes, it is understood that this is an example. In some cases, the first coil 107A may be simultaneously operable in both the first and second modes.

In various implementations of this example, current of one or more first frequencies (such as 20 hertz to 20 kilohertz) may be applied to the first coil 107A in the first mode and current of one or more second frequencies (such as above 20 kilohertz) may be applied to the first coil in the second mode. Such first frequencies of current applied to the first coil may cause the first coil to move the membrane 105 to produce one or more sound waves. Such second frequencies of current applied to the first coil may not cause the first coil to move the membrane and/or may cause the first coil to move the membrane to produce one or more sound waves that are imperceptible to a human (such as those above 20 kilohertz).

As also illustrated in this example, a gap 111 may be formed between a portion of the membrane 105 and the second electronic device 102A when the first electronic device 101A and the second electronic device are brought into contact.

However, in other implementations, one or more surfaces of the first electronic device 101A and/or the second electronic device 102A may be configured to mate when the first electronic device and second electronic device come into contact. Such an implementation is illustrated in the second example system 100B of FIG. 1C.

Figure 1C:
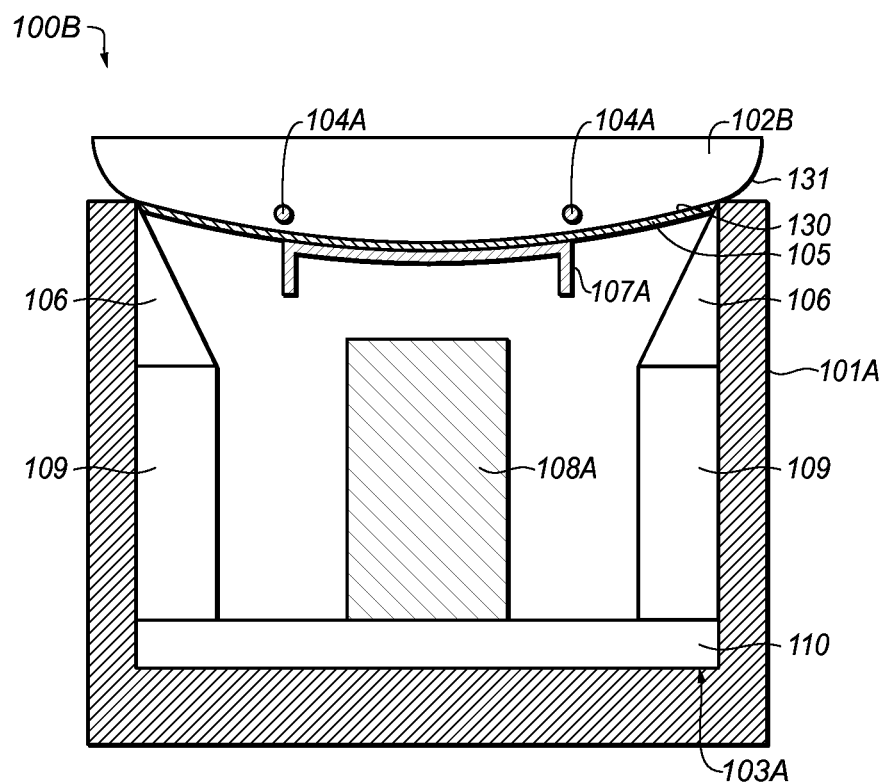
FIG. 1C is a cross-sectional diagram illustrating a second example system for inductive power transmission.

As shown in FIG. 1C, the first electronic device 101A may include a first surface 130 that is configured (such as geometrically) to mate with a surface 131 of a second electronic device 102B. Such mating may position the first coil 107A to be in proximity to the second coil 104A. Such proximity may improve inductive power transfer between the first and second coils over implementations that do not so proximately position the first and second coils. Such mating may also function to align the first and second coils and such alignment may improve inductive power transfer between the first and second coils over implementations that do not so align the first and second coils.

Although FIGS. 1A and 1B illustrate that the first coil 107A may be a component of an acoustic module 103A, it is understood that this is an example. In various implementations the first coil may be a dedicated inductive power transmission system coil, a component of a haptic device, and/or a component of another such device.

Figure 1D:
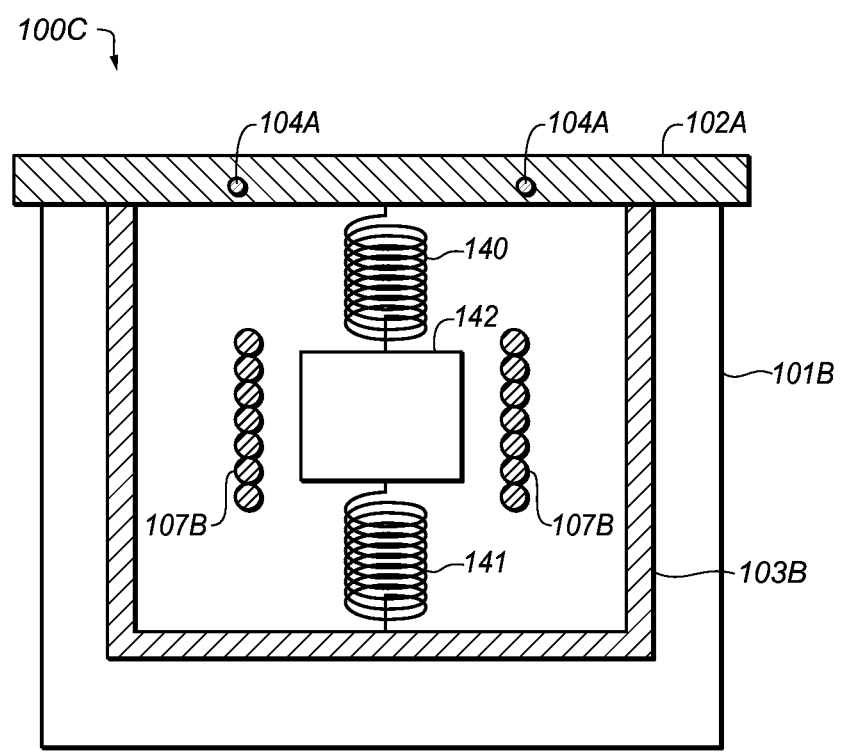
FIG. 1D is a cross-sectional diagram illustrating a third example system for inductive power transmission.

For example FIG. 1D illustrates a third example system 100C for inductive power transmission. In this third example system, the first coil 107B may be a coil of a haptic device 103B. The haptic device may include a weight element 142 that is mounted on springs 140 and 141. In the first mode, the first coil may cause the weight element to move (such as causing the weight element to vibrate and/or strike one or more internal surfaces of the haptic device) to produce one or more haptic outputs. In a second mode, the first coil may be utilized to inductively transmit power to the second coil 104A and/or inductively receive power from the second coil.

In various implementations of this third example, current of one or more first frequencies (such as 1 hertz to 500 hertz) may be applied to the first coil 107A in the first mode and current of one or more second frequencies (such as above 500 hertz) may be applied to the first coil in the second mode. Such first frequencies of current applied to the first coil may cause the first coil to move the weight 142 to produce a haptic response. Such second frequencies of current applied to the first coil may not cause the first coil to move the weight and/or may cause the first coil to move the weight to produce one or more haptic outputs that are imperceptible to a human.

Although the haptic device 103B is a particular example of a particular haptic device configuration, it is understood that this is an example. Various other kinds of haptic devices (such as motors, other actuators, and so on) may be utilized without departing from the scope of the present disclosure.

Returning to FIG. 1A, although the example acoustic device 101A is illustrated and described as positioning the first coil 107A around a center magnetic element 108A that may be a permanent magnet, it is understood that this is an example. In various implementations where the first coil is a component of an acoustic device, other acoustic device configurations may be utilized.

Figure 1E:
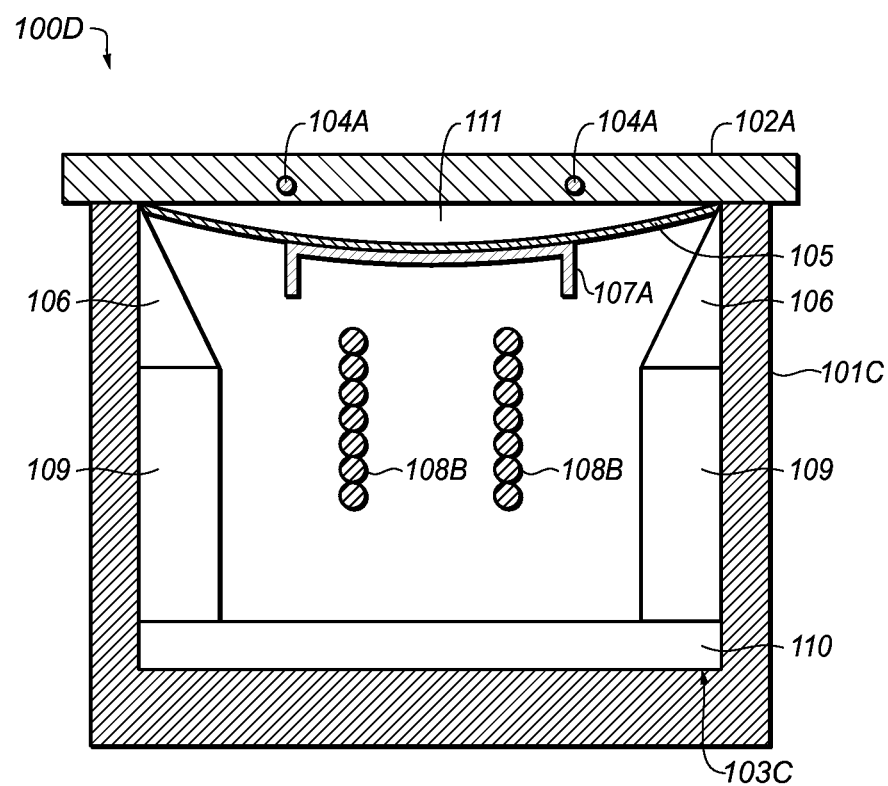
FIG. 1E is a cross-sectional diagram illustrating a fourth example system for inductive power transmission.

For example, FIG. 1E is a cross-sectional diagram illustrating a fourth example system 100D for inductive power transmission where the center magnetic element 108B of an acoustic device 103C is an electromagnet instead of a permanent magnet. Such an electromagnet may be a fields coil and/or any other kind of electromagnet. In various examples of such implementations, the electromagnet may be activated in the first mode such that a polarity of the electromagnet opposes and/or matches a polarity of the first coil 107A in order to cause movement of the membrane 105.

In some examples of such an implementation, the electromagnet may be deactivated in the second mode. In other examples of such an implementation, the electromagnet may be activated such that the electromagnet assists the first coil 107A in inductively transmitting power to and/or inductively receiving power from the second coil 104A.

Although FIGS. 1A-1E illustrate various implementations where the second coil 104A is a dedicated inductive power transmission coil, it is understood that these are examples. In various implementations, the second coil may be a component of one or more device such as an acoustic device (such as a microphone or speaker), a haptic device, and so on that includes at least a first mode that involves operation other than inductively transmitting and/or receiving power to the first coil 107A or 107B and a second mode that involves device inductively transmitting and/or receiving power to the first coil.

Figure 1F:
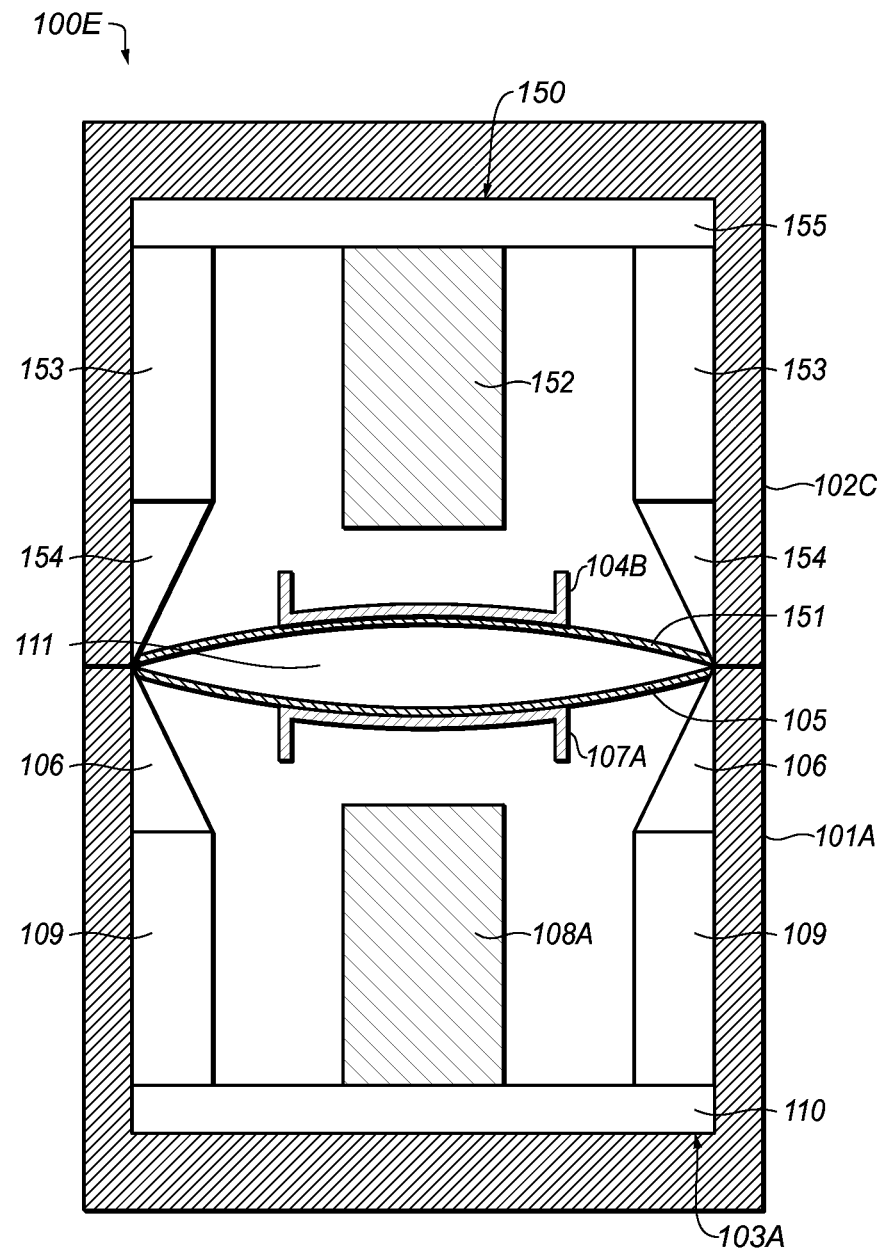
FIG. 1F is a cross-sectional diagram illustrating a fifth example system for inductive power transmission.

For example, FIG. 1F is a cross-sectional diagram illustrating a fifth example system 100E for inductive power transmission. In this example implementation, the second coil 104B may be a voice coil and/or similar component of an acoustic module 150 (such as a microphone or speaker). The second coil may be coupled to a membrane 151 that is in turn coupled to housing elements 154. The second coil may be positioned around a center magnetic element 152, which may be a permanent magnet and/or an electromagnet such as a fields coil, that is positioned between side magnetic elements 153. The center magnetic element and side magnetic elements may be positioned on top of a magnetic yoke element 155. In cases where the acoustic device is a speaker, current may be applied to the second coil to generate magnetic flux that is directed by the center magnetic element, the side magnetic elements to cause the membrane to move. Such movement may produce one or more sound waves.

In various implementations of this example, the second coil 104B may be operable in a plurality of modes. In a first mode, the second coil may be utilized to move the membrane 151 to produce one or more sound waves and/or register movement of the membrane to detect one or more sound waves. In a second mode, the first coil may be utilized to inductively transmit power to the first coil 107A (which may be stored by a power source of the first electronic device 101A and/or utilized to operate the first electronic device) and/or inductively receive power from the first coil (which may be stored by a power source of the second electronic device 102C and/or utilized to operate the second electronic device).

Further, although FIGS. 1A-1F illustrate the first coil 107A and/or 107B as a component of a device such as an acoustic module 103A-B and/or a haptic device 103C, it is understood that this is an example. In various cases, either the first coil and/or the second coil 104A and/or 104B may be a dedicated inductive power transmission coil or a component of a device such as an acoustic device (such as a microphone or speaker), a haptic device, and so on. Various combinations of the above implementations are possible and contemplated.

Figure 2:
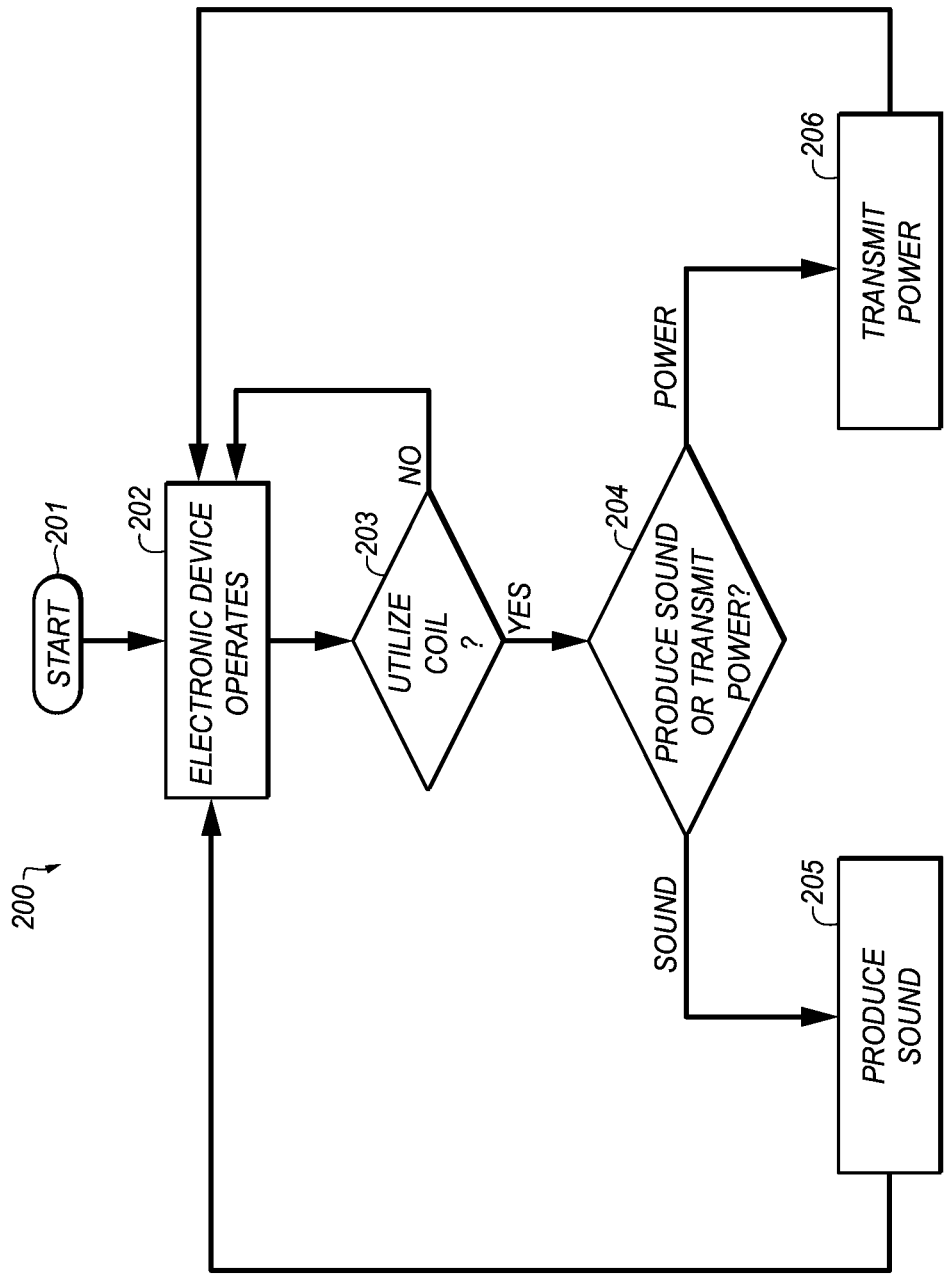
FIG. 2 is a flow chart illustrating a method for inductive power transmission. This method and/or similar methods may be performed by the example systems of FIGS. 1A-1F.

FIG. 2 is a flow chart illustrating a method 200 for inductive power transmission. This method and/or similar methods may be performed by the example systems of FIGS. 1A-1F.

The flow begins at block 201 and proceeds to block 202 where an electronic device operates. The flow then proceeds to block 203 where the electronic device determines to utilize a coil. The flow then proceeds to block 204 where the electronic device determines whether to utilize the coil in a sound wave producing mode or a power transmission mode.

If the electronic device determines to utilize the coil in a sound wave producing mode, the flow proceeds to block 205 where the electronic device utilizes the coil to produce one or more sound waves. The flow may then return to block 202 where the electronic device continues to operate.

However, if the electronic device determines to utilize the coil in a power transmission mode, the flow proceeds to block 206 where the electronic device utilizes the coil to transmit power to at least an additional coil of an additional electronic device. The flow may then return to block 202 where the electronic device continues to operate.

Although the method 200 is illustrated and described as including particular operations performed in a particular order, it is understood that this is an example. In various implementations, various orders of the same, similar, and/or different operations may be performed without departing from the scope of the present disclosure.

By way of example, blocks 204-206 illustrate the electronic device as determining whether or not to utilize the coil to produce sound waves or transmit power. However, in other implementations, the electronic device may determine to utilize the coil to receive power, receive sound waves, produce one or more haptic outputs, and so on. In some cases, the electronic device may determine among any number of different ways to utilize the coil as opposed to selecting between two options. In still other cases, the electronic device may utilize the coil to perform various of these possible operations at the same time.

As described above and illustrated in the accompanying figures, the present disclosure discloses systems, apparatuses, and methods for inductive power transmission. A first electronic device may include at least a first coil. The first coil may be operative in at least two modes. In the first mode, the first coil may be utilized to perform a function other than inductive power transfer. In the second mode, the first coil may be used to inductively transmit power to and/or inductively receive power from at least one second coil included in a second electronic device.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for inductive power transfer, comprising:
a first electronic device having a membrane;
a first coil associated with the first electronic device; and
a controller operable to change the first coil between a first mode and a second mode, wherein:
the first coil is operable in the first mode to move the membrane to produce sound using the membrane;
the first coil is operable in the second mode to inductively transmit power wirelessly to a second electronic device, the power received from a power supply physically coupled to the first coil; and
the first electronic device applies current of at least one first frequency to the first coil in the first mode and of at least one second frequency in the second mode.

2. The system of claim 1, wherein the first coil is a component of a speaker of the first electronic device.

3. The system of claim 1, wherein the second electronic device includes an additional controller operable to change a second coil between a third mode and a fourth mode, wherein:
the second coil is operable in the third mode to move an additional membrane to produce one of additional sound or an additional haptic output or detect the additional sound using the additional membrane; and
the second coil is operable in the fourth mode to inductively transmit power to the first electronic device or inductively receive power from the first electronic device.

4. The system of claim 3, wherein the second coil is a component of at least one of a speaker of the second electronic device, a microphone of the second electronic device, or a haptic device of the second electronic device.

5. The system of claim 1, wherein the first coil is a component of an acoustic component of the first electronic device.

6. The system of claim 5, wherein the first coil is positioned around at least one center magnetic element.

7. The system of claim 6, wherein the at least one center magnetic element comprises a permanent magnet.

8. The system of claim 6, wherein the at least one center magnetic element comprises an electromagnet.

9. The system of claim 8, wherein the electromagnet comprises a fields coil.

10. The system of claim 8, wherein the electromagnet is activated in the first mode such that a polarity of the electromagnet at least one of opposes or matches a polarity of the first coil.

11. The system of claim 10, wherein the electromagnet is deactivated in the second mode.

12. The system of claim 10, wherein the electromagnet is activated in the second mode such that the electromagnet assists the first coil in inductively transmitting the power to the second electronic device.

13. The system of claim 1, wherein a first surface of the first electronic device is configured to mate with a second surface of the second electronic device.

14. The system of claim 13, wherein the mating positions the first coil to be in proximity to a second coil associated with the second electronic device.

15. The system of claim 1, further comprising the second electronic device.

16. The system of claim 1, wherein the least one first frequency is between 20 hertz to 20 kilohertz and the at least one second frequency is above 20 kilohertz.

17. The system of claim 1, wherein applying the current to the first coil of the at least one second frequency causes the at least one first coil to at least one of:
move the membrane to produce the sound wherein the sound is audibly imperceptible by a human; or
not move the membrane.

18. The system of claim 1, wherein the first coil is simultaneously operable in at least the first mode and the second mode.

19. An electronic device, comprising: a first coil;
a weight element; a housing;
a mounting mechanism moveably coupling the weight element to the housing; and
a controller operable to change the first coil between a first mode and a second mode, wherein:
the first coil is operable in the first mode to move the weight element to produce a haptic output via a surface of the housing, the haptic output providing a tactile sensation via the surface;
the first coil is operable in the second mode to inductively transmit power to a second electronic device; and the electronic device applies current of a first frequency to the first coil in the first mode and a second frequency in the second mode.

20. A method for inductively transferring power, the method comprising:
operating a first coil associated with a first electronic device in a first mode wherein the first coil is operable in the first mode to detect sound based on movement of a membrane; and
operating the first coil in at least one second mode wherein the first coil is operable in the second mode to inductively transmit power to a second electronic device.

* * * * *